United States Patent [19]

Koleske et al.

[11] 3,892,821
[45] July 1, 1975

[54] POLYESTERS BLENDED WITH CYCLIC ESTER POLYMERS

[75] Inventors: Joseph Victor Koleske; Clyde Jesse Whitworth, Jr., both of Charlestown, W. Va.; Robert Dean Lundberg, Somerville, N.J.

[73] Assignee: Union Carbide Corporation, New York, N.Y.

[22] Filed: Oct. 11, 1973

[21] Appl. No.: 405,525

Related U.S. Application Data

[60] Division of Ser. No. 140,951, May 6, 1971, Pat. No. 3,781,381, which is a continuation-in-part of Ser. No. 812,314, April 1, 1969, abandoned.

[52] U.S. Cl. .................. 260/860; 260/6; 260/13; 260/823; 260/829; 260/830 R; 260/857 PA; 260/858; 260/874; 260/897 R; 260/898; 260/899; 260/900
[51] Int. Cl. ............................................ C08g 39/10
[58] Field of Search .......... 260/860, 75, 78.3 R, 32.2

[56] References Cited
UNITED STATES PATENTS

| | | | |
|---|---|---|---|
| 3,312,753 | 4/1967 | Bailey, Jr. ........................ | 260/860 |
| 3,331,890 | 7/1967 | Caldwell et al. .................. | 260/75 |
| 3,502,623 | 3/1970 | Hurworth et al. ................ | 260/860 |

Primary Examiner—Melvin Goldstein
Assistant Examiner—T. Pertilla
Attorney, Agent, or Firm—F. M. Fazio

[57] ABSTRACT

Uniform, thermoplastic, normally solid blends containing cyclic ester polymers and thermoplastic, normally solid polymer which can be a condensation polymer, and/or an addition polymer of olefinically unsaturated monomers having no more than one hydrogen bonded to each carbon of each olefinically unsaturated group thereof, including such polymers as cellulose derivatives, nylons, polyester polymers, polyoxyalkylenes, polycarbonates, poly(fluorocarbons), coumarone-indene resins, maleic acid or anhydride addition polymers and copolymers, stilbene addition polymers and copolymers, chlorinated polyethers, aromatic poly(hydroxy ether) polymers, polysufones, polypeptides, etc.

These novel blends are useful in the production of fibers, films, coatings, adhesives, wire and cable coatings, molding materials, extrusion materials, or shaped articles, having one or more unique properties, such as, dyeability, improved stress crack resistance, improved optical properties, e.g., improved hiding power, low haze, high gloss and/or high light transmission, improved plasticization, improved toughness, improved melt processability, improved impact resistance, and/or improved ability to disperse additives, such as, fillers coloring agents, antioxidants, extenders, etc.

8 Claims, No Drawings

POLYESTERS BLENDED WITH CYCLIC ESTER POLYMERS

This application is a division of application Ser. No. 140,951, filed May 6, 1971, now U.S. Pat. No. 3,781,381, issued Dec. 25, 1973 which in turn is a continuation-in-part of application Ser. No. 812,314, now abandoned, entitled "Uniform, Thermoplastic, Normally Solid Compositions Containing Diverse Components", by J. V. Koleske, C. J. Whitworth, Jr., and R. D. Lundberg, filed Apr. 1, 1969, all of the aforesaid applications being assigned to a common assignee.

BACKGROUND OF THE INVENTION a. Field of the Invention

The present invention relates to novel uniform, thermoplastic, normally solid polymer blends containing normally solid, thermoplastic polymers, such as, condensation polymers and addition polymers of olefinically unsaturated monomers having no more than one hydrogen bonded to each carbon of each olefinically unsaturated group thereof, in intimate association with cyclic ester polymers, such as polymer of epsilon-caprolactone, and having a wide range of application in the production of fibers, films, and other shaped articles. As used herein, the term "polymer" includes homopolymers, copolymers, terpolymers, etc., and, in general, a polymer made by polymerizing any number of monomers.

b. Description of the Prior Art

Thermoplastic polymers in the nature of normally solid condensation polymers and addition polymers of the type described herein including cellulose derivatives, nylons or polyamides, polypeptides, polyoxyalkylenes, polycarbonates, polyurethanes, polysulfones, poly(hydroxy ether) polymers, polyimides, polyureas, polyester polymers, maleic anhydride copolymers, stilbene homopolymers and copolymers, and the like have been long known and extensively used in the manufacture of household articles, industrial and commercial articles, wearing apparel, adhesives, molding compositions, extrusion compositions, protective coatings, wire and cable coatings, conduits hoses and a wide variety of other articles. While such heretofore known thermoplastic, normally solid polymers possess important and unique properties which enhance their widespread use for a great many applications, there has been a need to modify or correct certain undesirable properties in order to widen the field of use of such materials or to improve their current field of application.

For example, many of these thermoplastic polymers would be chosen for a particular use on the basis of their peculiar properties, except that they may be too stiff and difficult to shape and form or they may need improvement in other areas such as stress crack resistance, impact resistance, or optical properties. Another area of potential improvements by modification is in the melt processibility of the thermoplastic polymers, especially when using additives, such as, fillers, pigments, dye stuffs, anti-oxidants, stabilizers and other to be blended into the polymers. Due to the highly viscose and sticky nature of the thermoplastic polymers during processing, it is sometimes extremely difficult to disperse the additives uniformly throughout the polymer.

Attempts to prepare useful polymeric blends of two or more polymers have generally been unsuccessful. Blends of different types of polymers are often incompatible, and this incompatibility usually results in a marked deterioration or loss of the physical properties characteristic of each of the unblended polymers. Even where the two polymers are compatible in the melt, they often tend to separate into segregated domains of each individual polymer species. This segregation into separate domains results in a non-uniform mass and usually results in a marked deterioration of the physical properties which would be characteristic of either of the unblended polymers or copolymers.

Because of these factors, a large technology of copolymers has developed employing comonomers with varying degrees of success. By proper choice of such comonomers, copolymerization of different chemical units within the same polymer chain can be achieved to give some desirable properties in certain specific instances. Physical mixing or blending of the modifier, because of its simplicity and ease of performance, is preferred over the chemical or copolymerizing technique but has not been heretofore achievable over a wide range of the diverse thermoplastic polymers known and described herein. This invention now permits the blending of a wide range of diverse thermoplastic, normally solid polymers with cyclic ester polymers to form uniform polymer blends having useful and desirable properties over a broad composition range. It is believed that the presence of the cyclic ester polymer lessens segregation of the two polymers into separate domains and prevents the significant loss of physical properties which would be associated with such segregation.

Usually when one mixes or blends polymers, incompatibility is the expected result and compatibility of the polymers is not expected unless very small amounts of one of the components are added or if the polymers are very similar in nature as, for example, high and low density polyethylene. However, in certain instances blends of polymers can have commercial utility but in most cases the blended polymers had to be similar in nature or present in very small amounts to be compatible and no one polymer was blended with a wide range of diverse polymers with the possible exception of nitrocellulose. As summaried in *Principles of Polymer Chemistry*, Paul J. Flory, Cornell University Press, Ithaca, New York, 1953, at page 555 "incompatibility of chemically dissimilar polymers is observed to be the rule and compatibility is the exception."

SUMMARY OF THE INVENTION

The present invention provides novel uniform, thermoplastic polymeric blends and provides a means for readily altering the properties of such important plastics as thermoplastic, normally solid condensation polymers including polyoxyalkylenes, polycarbonates, cellulose esters, cellulose ethers, polyurethanes, polysulfones, polyamides, e.g., nylons, poly(hydroxy ethers), polyimides, polyureas, polyester polymers, and addition polymers of olefinically unsaturated monomers having no more than one hydrogen on each carbon of each olefinically unsaturated group thereof, to impart highly desirable properties not easily obtained in such plastics prior to this invention.

Heretofore, it was the case that, in many instances, when a polymeric modifier was attempted to be added to thermoplastic polymers of these types, the polymers would not accept the polymeric modifier and there resulted non-uniform masses and non-uniform, deteriorated properties.

This is not the case with the novel thermoplastic, normally solid compositions of this invention which contain cyclic ester polymers uniformly blended throughout with a thermoplastic, normally solid polymer. Unlike the previous attempts to form uniform blends of such thermoplastics with substantial amounts of polymeric modifiers, the thermoplastic polymers readily accept the cyclic ester polymer blended therein through the present invention. This ease of acceptance of cyclic ester polymers is surprising in that it applies throughout a diverse range of thermoplastic polymers to provide diverse improvements in the properties of the thermoplastic polymer. Despite the presence of cyclic ester polymer uniformly blended in the thermoplastic polymer, its beneficial properties are not greatly affected. When the cyclic ester polymer is added and blended with the thermoplastic polymer, the processability of the thermoplastic polymer is considerably improved. Not only are the milling characteristics of the thermoplastic enhanced, but also additives, such as fillers, accelerators, coloring agents, and other common plastic additives are more readily dispersed throughout the mass of the thermoplastic.

The handling and shaping of the novel thermoplastic, normally solid compositions to fabricate shaped articles are also facilitated. The novel compositions are more readily spread to conform to the configuration of molds and can be formed into sheets or other shapes which are easier to handle and fabricate in the desired manner in the soft or molten state. The novel compositions possess other advantages which will appear hereafter on a case by case basis.

The cyclic ester polymers which are contemplated in the practice of the invention are those which possess a reduced viscosity of at least about 0.1, and desirably from about 0.2 to about 15, and higher. The preferred polymers of cyclic esters for many applications have a reduced viscosity value of from about 0.3 to about 5. These polymers are further characterized by the following recurring structural linear Unit I:

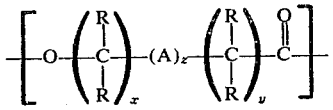

wherein each R, individually, is selected from the class consisting of hydrogen, alkyl, halo and alkoxy; A is the oxy group; x is an integer from 1 to 4; y is an integer from 1 to 4; z is an integer of zero or one; with the provisos that (a) the sum of $x + y + z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, n-decoxy, and the like. It is preferred that each R, individually, be hydrogen, lower alkyl, e.g., methyl, ethyl, propyl, isobutyl, and/or lower alkoxy, e.g., methoxy, ethoxy, propoxy, n-butoxy, and the like. It is further preferred that the total number of carbon atoms in the R substituents does not exceed 20.

In one embodiment, highly desirable cyclic ester polymers which are contemplated are characterized by both recurring structural Unit I supra and recurring structural Unit II:

(II) 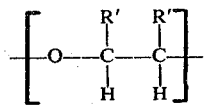

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having from 4 to 8 carbon atoms, desirably from 5 to 6 carbon atoms. It is preferred that recurring Unit II contains from 2 to 12 carbon atoms. Illustrative R' variables include methyl, ethyl, n-propyl, isopropyl, t-butyl, the hexyls, the dodecyls, 2-chloroethyl phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring linear unit (I) is interconnected through the oxy group (—O—) of one unit with the carbonyl group

of a second unit. In different language, the interconnection of these units does not involve the direct bonding of two carbonyl groups, i.e.,

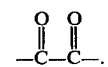

With relation to the relatively high molecular weight cyclic ester polymers, the terminal moieties thereof are not determinable by infrared analysis which factor is readily understandable since macromolecules are involved. On the other hand, the relatively lower molecular weight cyclic ester polymers, e.g., those having reduced viscosity values below about 0.25 are characterized by end groups which can be hydroxyl; carboxyl; hydrocarbyl, such as, alkyl, cycloalkyl, aryl, aralkyl, and alkaryl; hydrocarbyloxy, such as, alkoxy, cycloalkoxy; aryloxy, aralkoxy, and alkaryloxy; and possibly other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol and the like.

When the cyclic ester polymers are prepared from a mixture containing the cyclic ester monomer and a cyclic ether which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therewith. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit supra or with the alkylene moiety of a second oxyalkylene Unit (II).

Particularly preferred polymers of cyclic esters are those which are characterized by the oxypentamethylenecarbonyl chain as seen in recurring structural Unit III:

(III)
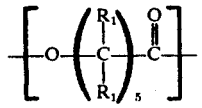

wherein each $R_1$ is hydrogen or lower alkyl, preferably hydrogen or methyl, with the proviso that no more than three $R_1$ variables are substituents other than hydrogen.

The preparation of the cyclic ester polymers is well documented in the patent literature as exemplified by U.S. Pat. Nos. 3,021,309 through 3,021,317; 3,169,945; and 2,962,524, and Canadian Pat. No. 742,294. Briefly, the process involves the polymerization of an admixture containing at least one cyclic ester monomer with or without a functional (e.g., active hydrogen-containing) initiator therefor, and a suitable catalyst, the choice of which will depend on the presence or absence of added initiator.

Suitable monomeric cyclic esters which can be employed in the manufacture of the cyclic ester polymers are best illustrated by the following formula:

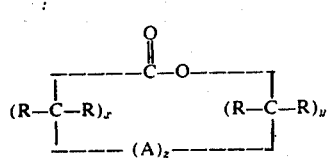

wherein the R, A, $x$, $y$, and $z$ variables have the significance noted in Unit I supra.

Representative monomeric cyclic esters which are contemplated include, for example, delta-valerolactone; epsiloncaprolactone; zeta-enantholactone; eta-caprylolactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-, dialkyl-, and trialkyl-epsilon-caprolactones, e.g., the monomethyl-, monoethyl-, monohexyl-, dimethyl-, diethyl-, di-n-propyl-, di-n-hexyl-, trimethyl-, triethyl-, and tri-n-propyl-epsilon-caprolactones, and the like; the monoalkoxy-and dialkoxy-delta-valerolactones and epsilon-caprolactones, e.g., the monoethoxy-, monoisopropoxy-, dimethoxy-, and diethoxy-delta-valerolactones and epsilon-caprolactones, and the like; 1,4-dioxane-2-one; dimethyl-1,4-dioxane-2-one, and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,021,309 to 3,021,317, such as, dialkylzinc, dialkylmagnesium, dialkylcamdium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithiium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end group. Carboxyl substituents on the initiator will result in polymeric products having carboxyl end-group. The initiator with the active hydrogen atom will thus be contained in the final polymeric molecule. The esterification or acylation of the afore-mentioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula:

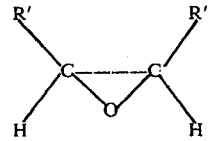

wherein each R', individually, has the meanings noted in Unit II supra, can be reacted with a monofunctional and/or polyfunctional (e.g., active hydrogen-containing) initiator possessing amino, hydroxyl, and/or carboxyl groups, preferably in the presence of a Lewis acid catalyst such as boron trifluoride. Illustrative alkylene oxides would include ethylene oxide, propylene oxide, the butylene oxides, styrene oxide, epichlorohydrin, cyclohexene oxide and the like.

Cyclic ester/alkylene oxide copolymers can also be prepared by reacting in the absence of an active hydrogen-containing initiator an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 0°C. of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80°C. and for a period of time sufficient to produce such cyclic ester/alkylene oxide copolymers.

The cyclic ester polymers employed herein contain in the polymeric chain at least a major molar amount, i.e., greater than about 50, preferably about 80, to about 100 mol percent of Units I and up to a minor molar amount, i.e., about 0 to less than about 50, preferably up to about 20, mol percent of other units such as alkylene oxide Units II, initiator residues or moieties, catalyst residues, and other difunctional and/or monofunctional units. The cyclic ester polymers containing about 100 mol percent of Unit I are preferred and those in which Unit I represents the oxypentamethylene carbonyl moiety are most preferred. In various desirable embodiments there can be employed cyclic ester polymers which contain from 100 to about 10 mol percent of Units I supra and from 0 to about 90 mol percent of Units II supra in the polymeric chains thereof.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is referred although cyclohexanone, chloroform, toluene or other organic solvent for the polymer may be used) at 30°C.

Mixtures of homopolymers and/or copolymers, terpolymers etc. made from different cyclic esters can be employed in this invention.

The cyclic ester polymer can be fluxed on a mill and sheeted off to form sheets or films. It can be extruded as a tape, rope, or other shape or can be extruded and pelletized. When formed by the dispersion polymerization technique, the cyclic ester polymer is obtained in powder or granular form. It can also be dissolved in a suitable solvent, such as, benzene, toluene, 2-nitropropane, methylene chloride and other solvents. Methylene chloride and other fast drying solvents may be preferred when the cyclic ester is used as a solution. Although the cyclic ester polymer can be used in this invention in any of the above-mentioned forms, it is usually preferred to use it in the form of powders, granules or pellets.

The thermoplastic organic polymer component of the novel blends disclosed and claimed herein are well known to those skilled in the plastics art. For the purposes of this invention the thermoplastic polymers are classified into two categories; namely, thermoplastic condensation polymers other than the cyclic ester polymers disclosed herein, and thermoplastic addition polymers, including copolymers, terpolymers, etc., of polymerizable olefinically unsaturated monomers having not more than one hydrogen bonded to each carbon of each olefinically unsaturated group thereof.

The term "condensation polymers" as used herein is consistent with the polymer classification set forth in *Principles of Polymer Chemistry* by Paul J. Flory, Cornell University Press, Ithaca, New York, 1953, at pages 37–50 and 57–61, and particularly in the paragraph bridging pages 39 and 40 and the one bridging pages 57 and 59. Thus, the term is not limited to those polymers which are produced with concurrent evolution of low molecular weight substances, such as, water, HCl NaCl and the like, but also include polymers produced by polymerization with no evolution of low molecular weight by-products and which contain interunit linkages not found in the monomers, e.g., the polyurethanes, polyureas, and the like, and to polymers produced by the addition polymerization of cyclic monomers, e.g., polyoxyalkylenes, chlorinated polyoxyalkylenes, polyimides, polylactams and the like. Suitable condensation polymers also include derivatives, i.e., the ethers and esters, of cellulose which is consistent with Flory's classification (pages 40 and 43). The condensation polymers employed herein are thermoplastic and normally solid, i.e., solid at ambient temperatures.

Typical thermoplastic condensation polymers include the thermoplastic poly(hydroxy ether) polymers preferably the thermoplastic aromatic poly(hydroxy ether) polymers formed by the condensation of aliphatic and aromatic polyhydroxy compounds, e.g., alcohols, carboxylic acids and phenols, preferably aromatic dihydroxy compounds or phenols having 6 to 24 carbon atoms with an epihalohydrin. An illustration is the polycondensate of bisphenol A and epichlorhydrin to form a thermoplastic polymer having recurring groups of the formula:

Another class of thermoplastic condensation polymers suitable for use herein is the polycarbonate class, preferably aromatic polycarbonates derived from aromatic dihydroxy compounds or phenols having 6 to 24 carbon atoms and phosgene. An illustration is the polycarbonate made by reacting phosgene with bisphenol A and having the recurring unit

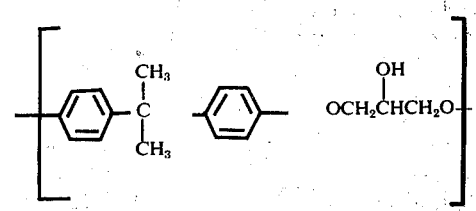

Another class of thermoplastic condensation polymers is the polysulfones, preferably the aromatic polysulfones derived from aromatic dihydroxy compounds having 6 to 24 carbon atoms and di(chloroaryl) sulfones. An illustration is the polysulfone made by reacting bisphenol A and di(parachlorophenyl) sulfone and having the recurring unit of the formula:

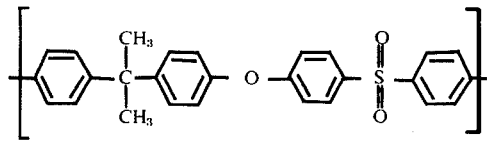

The thermoplastic cellulosic esters and ethers are widely used as molding, coating and film-forming materials and are well known. These thermoplastic condensation polymers can also be used as the thermoplastic component in the practice of this invention. These materials include the solid thermoplastic forms of cellulose nitrate, cellulose acetates, (e.g., cellulose diacetate, cellulose triacetate), cellulose butyrate, cellulose acetate butyrate, cellulose propionate, cellulose tridecanoate, carboxymethyl cellulose, ethyl cellulose, hydroxyethyl cellulose and acetylated hydroxyethyl cellulose as described on pages 165–170 of *Modern Plastics Encyclopedia*, 1962, and references listed therein.

Another class of thermoplastic condensation polymers is the polyamides, such as, nylon 6 (e.g., polycaprolactam), nylon 6/6 (e.g., hexamethylenediamine-adipic acid or anhydride polycondensate), nylon 6/10 (e.g., hexamethylenediamine-sebacic or anhydride polycondensate), nylon 8 (e.g., N-alkoxymethyl-hexamethylenediamine-adipic acid or anhydride polycondensate), nylon 11 (e.g. 11-aminoundecanoic acid polycondensate) and the like as described on pages 219–227 of *Modern Plastics Encyclopedia*, 1962, and references listed therein. Suitable for use herein are polyamides of hydrocarbon dicarboxylic acids having 2 to 18 carbon atoms and hydrocarbon diamines having 2 to 18 carbon atoms and homopolymers of such diamines.

Another class of thermoplastic condensation polymers is the normally solid thermoplastic polyoxyalkylene polymers, both unsubstituted and halogenated. The lowest homologous type of this class is the polyoxymethylene polymers, otherwise called acetal resins, and are described on pages 140–142 of *Modern Plastics Encyclopedia*, 1962. In addition, the normally solid polyoxyethylene, polyoxypropylene, and polyoxybutylene polymers and copolymeric forms, e.g., poly(oxyethyleneoxypropylene) copolymers wherein the oxyethylene units are randomly distributed or present in blocks, poly(oxymethyleneoxyethylene) copolymers and poly(oxymethyleneoxypropylene) copolymers having a block or random distribution are all well known and can be employed as the thermoplastic component. The halogenated polyoxyalkylene normally solid polymers are also well known and are suitable for use in the novel blends of this invention. For example, the chlorinated polyethers made and sold under the name of Penton by Hercules Powder Company (pages 171–172 *Modern Plastics Encyclopedia*, 1962) and having the recurring unit of the formula:

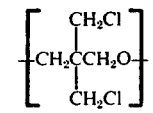

can be used. The chlorinated polyethers made and sold under the name Hydrin by B. F. Goodrich Company and having the recurring unit of the formula:

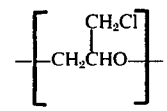

as well as copolymers containing such units and oxyethylene units, —$CH_2CH_2O$—, in random or block distribution, also are suitable as the thermoplastic component. These are made by addition polymerization of epichlorhydrin which can be conducted with ethylene oxide if the copolymer is desired. Other oxyalkylene units can be provided in place of or in addition to oxyethylene by the addition polymerization of other alkylene oxides with chlorinated oxetane (used to produce Penton) or epichlorhydrin.

Another class of thermoplastic condensation polymers is the normally solid polyester polymers of polyhydric, preferably dihydric, alcohols having 2 to 18 carbon atoms and polycarboxylic, preferably dicarboxylic, acids or acid anhydrides having 2 to 18 carbon atoms, for example, those described in pages 244–250, *Modern Plastics Encyclopedia*, 1962, and references cited therein. Examples of suitable polyester polymers are poly(ethylene terephthalate), poly(1,3-propylene maleate), poly(ethylene fumarate), poly(diethylene phthalate), poly(2,3-butylene adipate), and the like.

Polyurethanes, otherwise known as isocyanate resins, also can be modified in accordance with this invention. Some of these thermoplastic condensation polymers are described on pages 216–218 of *Modern Plastics Encyclopedia*, 1962, and references cited therein. For example, polyurethanes formed from toluene diisocyanate (TDI) or diphenyl methane 4,4-diisocyanate (MDI) and a wide range of polyols, such as, polyoxyethylene glycol, polyoxypropylene glycol, hydroxy-terminated polyesters, polyoxyethylene-oxypropylene glycols are suitable. The thermoplastic, normally solid polyurethanes described in Saunders & Frisch, "Polyurethanes: Chemistry And Technology", Interscience Publishers, New York, Part I, "Chemistry", published in 1963 and Part II, "Technology", published in 1964 can be used.

The polyureas can also be advantageously modified by cyclic ester polymers according to this invention.

Suitable polyureas are thermoplastic solids having recurring units of the formula: $-[NHR''NHCONHR''NHCO]-$ wherein $R''$ is arylene having 6 to 12 carbon atoms, alkylene having 2 to 12 carbon atoms, cycloalkylene having 3 to 12 carbon atoms, e.g., $-[NH(CH_2)_6NHCONH(CH_2)_6NHCO]-$.

In the second category of thermoplastic organic polymers are the addition polymers of olefinically unsaturated monomers having no more than one hydrogen on each carbon atom of each olefinically unsaturated group thereof, i.e., monomers having the group, $C=C<$, each carbon of which is bonded to 0 or 1 hydrogen atom but not 2. Monomers of this type include maleic acid or acid anhydride, fumaric acid, stilbene, cyclohexene, cyclobutene, tetrafluoroethylene, hexafluoropropylene, trifluoroethylene, chlorotrifluoroethylene, tetrahydrophthalic acid or acid anhydrides, 3,4-dimethyl-2-pentene, terpene, 2-hexene, 3-heptene, coumarone, indene and the like. Thermoplastic, normally solid homopolymers or copolymers of one or more monomers of the type listed above are suitable, e.g., the fluorocarbon polymers, namely, poly(tetrafluoroethylene), poly(trifluoroethylene), poly(chlorofluoroethylene), and poly(hexafluoropropylene) described in pages 198–202, *Modern Plastics Encyclopedia*, 1962, and references cited; the coumarone-indene resins, petroleum resins and polyterpene resins described in pages 174–175 and cited references of *Modern Plastics Encyclopedia*, 1962; maleic acid or acid anhydride addition polymers and copolymers, e.g., maleic anhydride-methyl vinyl ether, maleic anhydride-ethyl vinyl ether and maleic anhydride-isobutyl vinyl ether addition copolymers; stilbene addition polymers and copolymers, e.g., stilbene-acrylonitrile copolymers, and the like.

The relative proportions of cyclic ester polymer and thermoplastic, normally solid polymer employed in the novel compositions of this invention can be varied over very wide percentage ranges depending upon the particular characteristics desired in the particular composition being prepared and its intended use. For example, the cyclic ester polymer can be present in amounts ranging from about 1 to about 95% and the thermoplastic polymer component can be present in amounts ranging from about 5 to about 99%, based on the total weight of cyclic ester polymer and thermoplastic polymer component. It is preferred in most cases to utilize a minor amount of the cyclic ester polymer and a major amount of the thermoplastic polymer component. More preferably, about 2 to about 40% of the cyclic ester polymer and about 60 to about 98% of the thermoplastic polymer component are employed and most preferably about 5 to about 30% of the cyclic ester polymer and about 70 to about 95% of the thermoplastic polymer component are employed.

A surprising aspect of the present invention is the discovery that improved properties are obtained when even very small amounts of the cyclic ester polymer are used. It is equally, if not more, surprising to have found that even major amounts of cyclic ester polymer, i.e., up to about 95 weight percent, do not completely obliterate the characteristic properties of the thermoplastic component. It is an extremely important discovery of this invention that, when up to about 40% on a weight basis of cyclic ester polymer is used in the novel compositions, there results, in many systems, an easily processable thermoplastic composition which can be molded at elevated temperatures and under pressures, if desired, to form thermoplastic articles having physical properties very close to the physical properties of articles made from the thermoplastic component alone. The novel compositions containing minor amounts of cyclic ester polymer can be molded or extruded to form sheets, plaques, pellets, tapes or other articles which are non-blocking and can be stacked one upon the other without sticking together. Subsequently, they can be shaped by molding at elevated temperatures and pressures or by other means. Even relatively minor amounts such as 30% or less decrease the stiffness of most thermoplastic components and render them less sticky and more easily worked.

The thermoplastic polymer component and cyclic ester polymer can be mixed or blended by any desired technique. For example, they can be blended on a two-roll mill, Brabender mixer, or other equipment at low to moderate temperatures, for example, in the range of 60°C. or higher, for example, up to as high as 180° to 250°C. However, the lower temperatures are usually suitable and are economically preferred.

Suitable equipment for fluxing the thermoplastic component and cyclic ester polymer together include Banbury mixers, Brabender mixers, screw extruders, two-roll mills, or any other mixing devices adapted to mix highly viscous or semi-solid materials at low to moderate or high temperatures. The time of blending or fluxing is not narrowly critical and a sufficient blending time to obtain a substantially uniform blend is usually satisfactory. Mixing of the cyclic ester polymer and the thermoplastic component in the heated or molten state is believed to be facilitated by the partial hydrocarbon nature of the cyclic ester polymer. Either there can be no phase separation, or the phase separation is such that there is no deleterious change of physical properties in blending the two different polymeric materials together in accordance with this invention.

Illustrative times of blending are in the range of 1 and 2 minutes to 30 minutes or an hour. In the usual case, about 5 to 15 minutes is adequate. After adequate blending, the novel thermoplastic composition is cooled to ambient temperature and thereafter can be shaped and/or formed in any desired manner. If desired, other materials can be added during blending, for example, the usual ingredients used in the compounding of thermoplastic polymers can be employed. Such added materials can include fillers, antioxidants, light stabilizers, heat stabilizers, plasticizers, etc.

The novel thermoplastic compositions of this invention have improved physical properties which are at least similar to the physical properties of the major component of the composition. A most striking aspect of the invention is that additions of cyclic ester polymers in amounts over a wide range are readily accepted by a wide range of diverse thermoplastic polymers and at the same time retain the essential characteristic of the thermoplastic polymer.

In a preferred embodiment, the invention relates to novel shaped and molded articles, especially fibers, yarns, woven cloth, carpets, etc., which are formed from novel blends of normally solid, thermoplastic polyamides such as the nylons illustrated previously and the cyclic ester polymers. Such novel shaped and molded articles exhibit outstanding characteristics such as excellent resistance to soiling and apparent soiling, good anti-static and non-cling properties, significant increase in opacity (without the addition of titanium dioxide), favorable optical properties especially under artificial lighting, brighter yarn, etc. This significant improvement in characteristics is obtained while maintaining a desirable combination of other mechanical and physical properties in the novel shaped article.

In this preferred embodiment, the novel blends or shaped articles comprise cyclic ester polymers which contain from 100 to about 5 mol percent of Units I supra and from 0 to about 95 mol percent of Units II supra in the polymeric chains thereof, desirably from about 70 to about 10 mol percent of Units I and from about 30 to about 90 mol percent of Units II, and preferably from about 60 to about 15 mol percent of Units I and from about 40 to about 85 mol percent of Units II. Other moieties or groups can be interspersed in the polymeric chains of the cyclic esters such as the urethane group,

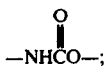

the mono- and polyaromatic rings including fused and bridged rings such as phenylene, biphenylene, naphthylene, phenylene-alkylene-phenylene, and phenylene-alkylidene-phenylene; initiator moieties; catalyst residues; etc. Such groups, if present, represent a small mol percent of the cyclic ester polymer. Such novel blends or shaped articles can contain up to about 15 weight per cent, and higher, of cyclic ester polymer, based on the total weight of polyamide and cyclic ester polymer. A concentration of from about one to about 10 weight per cent (and preferably from about 2 to about 7 weight per cent) cyclic ester polymer in the novel blend is generally sufficient to obtain novel shaped or molded articles which exhibit the outstanding properties noted previously.

DESCRIPTION OF SPECIFIC EMBODIMENTS

The following examples are presented. Unless otherwise specified, all percentages and parts are by weight, all temperatures are on the Centigrade scale, and all reduced viscosities are measured at a concentration of 0.2 gram of polymer in 100 milliliters of benzene at about 30°C. Figures given for physical properties in the tables below are averages of test results on two or more samples of each material and, in some instances, such averages have been rounded off.

The testing for various physical properties was done on an Instron tensile tester using specimens about ¼ inch wide, 0.020 to 0.30 inch thick and about 1 inch in gauge length. Gauge length is the length of the specimen between the jaws of the testing apparatus. The secant molulus or stiffness was determined at a strain rate of 10% in inches per inch per minutes and the other tensile property at a strain rate of 100% in inches per inch per minute.

Secant Modulus or Stiffness

This value was determined by subjecting the specimen to tensile stress and elongating it 1%. The modulus is then calculated as the ratio of the tensile stress (T) needed to elongate the sample 1% of its original length to the elongation (or strain) of the specimen. 1% Secant Modulas for 1 in. specimen = T/0.01 = 100T

Yield Stress

This value was determined as the stress at the first major break in the stress-strain curve and usually corresponds to the necking-in point.

Tensile Strength or Ultimate Strength

This value was determined as the tensile stress at rupture of the specimen. It was calculated from the load on the specimen at rupture, divided by the original cross sectional area.

Elongation

This value was determined as the extension of the specimen at the point of break or rupture.

$$\% \text{ elongation} = \frac{L - L_o}{L_o} \times 100\%$$

$L$ = length at rupture
$L_o$ = initial length of specimen.

Rupture Energy

This value was determined as the area under the entire stress-strain curve when the sample is subjected to tensil stress up to the rupture point.

Strain Rate

This value is the rate at which the sample is being elongated relative to its original dimension. Thus, if a 1 inch gauge length sample is used and the cross head of the testing apparatus is driven at a speed of 1 inch per minute, the strain rate is the ratio of gauge length to this speed or 1 inch divided by 1 inch per minute which is a rate of 1 inch per inch per minute. This value is reported hereinbelow as a percent, in which case the ratio is multiplied by 100%.

Body Voltage

This involves measurement of the voltage built up on a person when walking on a carpet. The test is carried out according to the revised procedure established by the American Carpet Institute's Subcommittee on static electricity Aug. 13/68 and approved by the American Carpet Institute's Technical Committee Aug. 19/68.

Volume Resistivity

Current flow is measured through a 10 cm. length of lubricant-free yarn, of approximately 10,000 total denier, with 1000 volts applied.

$$\text{Volume resistivity} = \frac{AV}{LI} \text{ohm cms}$$

$A$ = Cross sectional polymer area cm²
$L$ = length (10 cm)
$V$ = applied voltage (1000)
$I$ = current (amperes)

Opacity

Opacity is a comparative evaluation of individual fibers viewed against a black background under a low power microscope.

Lustre

This is a subjective evaluation of the relative light reflectance level of yarn samples. Fiber containing the cyclic ester polymer to be evaluated may be knitted into a test "stocking" or, alternatively, it may be crimped, then tufted into a test carpet for observing lustre.

Relative Viscosity

This is the ratio of the viscosity of a 1 weight per cent solution of the polymer (or fiber) in sulfuric acid, to that of the viscosity of the pure solvent. Viscosities are measured at 20°C using an Ostwald capillary viscometer.

Soiling

Fiber to be evaluated is either knitted into a test stocking or crimped and tufted into a test carpet. In this test, 5 inch square samples are fastened on the inner wall of a cylinder which rotates about its axis, containing standard soiling material and ball bearings. After treatment, the degree of soiling may be rated visually, before or after vacuuming. Equipment used is a Cyanamid Soil Tester (Custom Scientific Instruments Inc. Model CS-79-012)

Heat Stability

Yarn samples are placed in an oven at 130°C for 1 hour. Yarn tenacity (grams/denier), yarn elongation to the break (%) and yarn color are determined before and after the oven exposure. Loss in tenacity or elongation or development of yellowness indicate the degree of instability to heat.

Light Stability and Fastness

Yarn samples, wound on a black card, are evaluated for tenacity and elongation before and after exposure to Xenon arc light, using a glass filter, in an Atlas Electric Devices Co. "Weatherometer" Model 600-WR. Loss in tenacity or elongation over a 250 hour exposure period indicates the degree of light instability.

Color fastness is determined by exposing, in the foregoing equipment, dyed samples of test stockings of the fiber. Color change due to light exposure is judged by comparing exposed and unexposed portions of the same dyed stocking.

Extractables

Yarn (10 grams) are extracted with methanol in a Soxhlet apparatus for 8 hours. The methanol is then evaporated, the weight of the residue representing the extractables which is expressed as a percentage of the original yarn weight.

EXAMPLE 1

A series of three blends (Nos. 2, 3 and 4) were made by first fluxing an aromatic poly(hydroxy ether) made by the reaction of bisphenol A and epichlorhydrin and having recurring units of the formula:

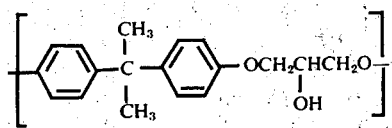

The poly(hydroxy ether) had a molecular weight of about 30,000, a heat distortion temperature (ASTM D648) of 188°F. at 264 psi and a specific gravity of about 1.182. The poly(hydroxy ether) in each case was fluxed on a two-roll mill at a temperature as respectively shown in Table I below.

Then, a cyclic ester polymer of epsilon-caprolactone was added to each fluxing poly(hydroxy ether) in the proportions respectively set forth in Table I. The cyclic ester polymer (PCL) used in each case was prepared by dispersion polymerization in heptane of epsilon-caprolactone in the presence of 3% vinyl chloride-lauryl methacrylate copolymer as interfacial agent and 0.1% of triisobutylaluminum as catalyst (percentages based on weight of caprolactone) and had a reduced viscosity of 1.89. After addition of the cyclic ester polymer the resulting blends were milled at the temperatures for the times respectively given in Table I and were sheeted off the mill and cooled. During milling of all of the blends, fluxing and banding were observed to be good and all exhibited quite acceptable bank behavior. Also, the remaining milling characteristics were acceptable at the proper temperature.

A similar quantity of the poly(hydroxy ether) identified above was fluxed in the same manner at the temperature listed in Table I for the time similarly listed. No PCL was added to this control sample (No. 1) which was sheeted off the mill after the designated milling time.

The resulting blends and control sample were then compression molded at 1500 to 2000 psi and 150°C. for 10 seconds into plaques about 20 to 30 mils thick. The plaques were then aged for about 8 days and then measured for physical properties, the results of which are given in Table I. The physical properties were measured again after 22 days aging at ambient temperatures and the obtained values were in agreement with the respective values given in Table I.

TABLE I

|  | 1 | 2 | 3 | 4 |
|---|---|---|---|---|
| Wt. % PCL | 0 | 1 | 10 | 50 |
| 1% Secant Modulus, psi* | — | 166,000 | 168,000 | 210,000 |
| Yield Stress, psi |  | 9200 | 8900 | — |
| Tensile Strength, psi |  | 8300 | 7500 | 400 |
| Elongation, % |  | 280 | 280 | 1300 |
| Rupture Energy, in. lbs./in.³ |  | 19,600 | 17,400 | 2,700 |
| Izod Impact Strength,⁽¹⁾ ft.lbs./in. | 2.06 | 1.92 | 1.01 | — |
| Heat Distortion⁽²⁾ Temperature, °C. | 87 | 82 | 66 | — |
| Strain Rate, in./in./min. | 100 | 100 | 100 | 100 |
| Milling Temperature, °C. | 125 | 120–130 | 120–140 | 80–130 |
| Milling Time, min. | 5 | 10 | 10 | 10 |

*1% secant modulus values obtained at 10% strain rate, in./in./min.
⁽¹⁾ASTM 0256-56
⁽²⁾ASTM D648-56

This example illustrates the surprising property of the PCL to blend well with the poly(hydroxy ether). Visual observations of the 1 and 10% PCL (Nos. 2 and 3) indicated that these blends had better optical properties than the poly(hydroxy ether) alone with no PCL added (No. 1). This example also illustrates the flexibilization of poly(hydroxy ether) by the addition of PCL to provide a more flexible and tougher material. Sample 2, the 50% blend (No. 4), exhibited very good adhesion to aluminum foil. All blends (Nos. 2, 3 and 4) were uniform throughout and were more flexible than the control sample (No. 1).

EXAMPLE 2

A series of two blends (Nos. 6 and 7) were made by first fluxing in a Brabender head a cyclic ester polymer and a polysulfone made by polymerizing bisphenol A and di(parachlorophenyl) sulfone and having recurring units of the formula:

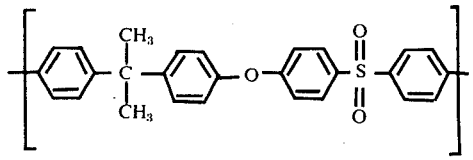

The polysulfone had a melt flow at 350°C. of about 7.0 dg/min at 44 psi (ASTM D792), a softening point (ASTM D648) of about 345°F. at 264 psi as determined by Heat Deflection Temperature and a specific gravity of about 1.24. The cyclic ester polymer was made from epsilon-caprolactone in the same manner as described in Example 1 and was used in the amounts shown in Table II below. The respective blends were fluxed for about 5 minutes at a temperature of 250°C. for blend No. 6 and a temperature of 230°C. for blend No. 7, using a 190°C. jacket temperature, 125 rpm rotor speed, and a No. 6 roller head.

Each blend was then compression molded into plaques having a thickness of about 20 to 30 mils. In addition, control plaque (No. 5) of the same approximate thickness were compression molded from pellets of the above-identified polysulfone. All plaques were then tested on an Instron tensile tester for physical properties and the results are respectively set forth in Table II.

TABLE II

| | 5 | 6 | 7 |
|---|---|---|---|
| Wt. % PCL | 0 | 5 | 50 |
| 1% Secant Modulus, psi* | 260,000 | 142,000 | 87,000 |
| Yield Stress, psi | 8900 | 9100 | — |
| Tensile Strength, psi | 8400 | 7700 | 3300 |
| Elongation, % | 144 | 120 | 140 |
| Rupture Energy, in.lbs./in.³ | 11,000 | 8,500 | 4,300 |
| Strain Rate, in./in./min. | 20 | 100 | 100 |

*1% secant modulus value obtained at 10% strain rate, in./in./min.

This example also illustrates the production of uniform blends of polysulfone and PC. The blends Nos. 6 and 7 were more flexible than the control sample (No. 5), illustrating the use of added PCL to flexibilize polysulfone polymers. In addition, the blends are more easily processed or fluxed at elevated temperatures. Modulus values (stiffness) of the blends are far less than modulus values for polysulfone alone at moderately elevated temperatures of about 60°C. or more.

EXAMPLE 3

A series of six blends (Nos. 9–14) were made by fluxing in a Brabender head a cyclic ester polymer and a polycarbonate made by the polymerization of bisphenol A with phosgene and having recurring units of the formula:

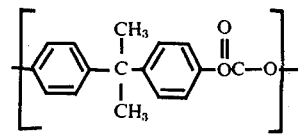

The polycarbonate had a high molecular weight, a specific gravity of about 1.2 (ASTM D-792), a flexural modulus of 340,000 psi (ASTM-695), and a heat distortion temperature of about 270°C. at a load of 264 psi (ASTM-D648). The blends were fluxed and milled in a Brabender head at a jacket temperature of 170° to 180°C. and a polymer melt temperature at fluxing of about 220° to about 250°C.

Then cyclic ester polymer was used in the proportions respectively set forth in Table III below. The cyclic ester polymer (PCL) used in each case was prepared by polymerizing epsilon-caprolactone in the manner described in Example 1. The blends were milled for about 5 to about 10 minutes under the conditions given above and then were sheeted off the mill and cooled. The milling characteristics of all blends were good with little or no sticking to the surface of the Brabender head.

A similar quantity of polycarbonate (No. 8) identified above was fluxed in the same manner at the temperature and time listed above. No PCL was added to this control sample, which was sheeted off the mill after the designated milling time.

The resulting blends and control sample were then compression molded into plaques 20 to 30 mils thick. The plaques were then tested on an Instron tensile tester for physical properties, which are listed in Table III below. The addition of PCL to the thermoplastic polymer at amounts of 20 to 50% flexibilizes the thermoplastic, giving rise to higher elongations and a softer composition.

TABLE III

| | 8 | 9 | 10 | 11 | 12 | 13 | 14 |
|---|---|---|---|---|---|---|---|
| Wt. % PCL | 0 | 1 | 5 | 10 | 20 | 50 | 90 |
| 1% Secant Modulus, psi* | 171,000 | 150,000 | 167,000 | 164,000 | 140,000 | 62,500 | 39,000 |
| Yield Stress, psi | 8500 | 8000 | 9200 | 8300 | 7400 | — | 1950 |
| Tensile Strength, psi | 8700 | 8700 | 7400 | 5900 | 8100 | 3800 | 4500 |
| Elongation, % | 220 | 230 | 53 | 45 | 270 | 470 | 1490 |
| Rupture Energy, in.-lbs./in.³ | 16,200 | 16,400 | 3800 | 2700 | 15,200 | 14,400 | 36,700 |
| Strain Rate, in./in./min. | 100 | 100 | 100 | 100 | 100 | 100 | 100 |

*1% secant modulus values obtained at 10% strain rate, in./in./min.

EXAMPLE 4

A series of three blends (Nos. 16, 17 and 18) were made by fluxing on a two-roll mill a cyclic ester polymer and a predominantly polyoxymethylene polymer containing predominantly, i.e., 95 to 98 mol % oxyethylene units, —CH$_2$O—, and 2 to 5 mol % oxyethylene units, —CH$_2$CH$_2$O—, made by copolymerizing trioxane with a small amount of ethylene oxide. This polyoxymethylene polymer had a melt index of about 9.0 (gms in 10 mins), a specific gravity of about 1.410 (ASTM 792-60T), a flow temperature (ASTM D569-59) of about 345°F., and a melting point of about 325°F. to about 330°F.

The cyclic ester polymer (PCL) used was prepared from epsilon-caprolactone in the same manner as described in Example 1 and was used in the proportions respectively set forth in Table IV below. The resulting blends were milled for the times and at the temperatures listed in Table IV below. The milling behavior for the blends was found to be good and there was little or no sticking to the rolls of the two-roll mill.

A similar quantity of the same polyoxymethylene (No. 15) was milled in the same manner at a temperature of about 160°C. for about 5 minutes. No PCL was added to this control sample, which was sheeted off the mill after the designated milling time.

The resulting blends and the control sample were then compression molded into plaques about 20 to 30 mils thick. The physical properties of the plaques were measured on an Instron tensile tester and the measurements are given in Table IV below.

thermoplastic polyoxyethylene polymer having a melting point range of about 63° to 67°C., a viscosity of about 8,000 to about 16,000 centipoise as a 5% aqueous solution at 25°C., a specific gravity as a film of about 1.21 g/cc, and a reduced viscosity of about 4.9 to about 6.1 dl/g at a concentration of 0.2 gram per 100 ml of water at 20°C.

The cyclic ester polymer was used in adequate proportions respectively producing the percentages of PCL set forth in Table V below. The cyclic ester polymer (PCL) used in each case was prepared from epsilon-caprolactone in the same manner as described in Example 1. The resulting blends were milled for about 5 minutes each at a temperature of 90° to 100°C. The milling characteristics of all blends were found to be good.

A similar quantity of the polyoxyethylene polymer identified above was fluxed and milled in the same manner as described above, at the same approximate temperature and for the same approximate period of time. No PCL was added to this control sample (No. 19) which was sheeted off the mill after the designated milling time.

A similar quantity of the cyclic ester polymer identified above was fluxed in the same manner at the same temperature and for the same period of time as listed above. This control sample (No. 28) contained no polyoxyethylene and was sheeted off the mill after the designated length of time.

The resulting blends and control samples were then compression molded into plaques about 20 to 30 mils

TABLE IV

|  | 15 | 16 | 17 | 18 |
|---|---|---|---|---|
| % PCL | 0 | 10 | 50 | 90 |
| Secant Modulus, psi* | 170,000 | 143,000 | 67,000 | 33,000 |
| Yield Stress, psi | — | — | — | — |
| Tensile Strength, psi | 7600 | 6500 | 3600 | 3400 |
| Elongation, % | 28 | 90 | 20 | 1200 |
| Rupture Energy, in.-lbs./in.$^3$ | 1940 | 5700 | 650 | 25,000 |
| Strain Rate, in./in./min. | 100 | 100 | 100 | 100 |
| Milling Temperature, °C. | about 160 | 160 | 160 | 160 |
| Milling Time, min. | about 5 | 5 | 10 | 10 |

* secant modulus values obtained at 10% strain rate, in./in./min.

EXAMPLE 5

A series of eight blends (Nos. 20–27) were made by fluxing on a two-roll mill a cyclic ester polymer and a thick. The plaques were then tested for physical properties on an Instron tensile tester and the measurements are given in Table V below.

TABLE V

|  | 19 | 20 | 21 | 22 | 23 | 24 | 25 | 26 | 27 | 28 |
|---|---|---|---|---|---|---|---|---|---|---|
| % PCL | 0 | 1 | 2 | 5 | 10 | 20 | 50 | 75 | 90 | 100 |
| Rupture Energy, in.-lbs./in.$^3$ | 5165 | 17802 | 15421 | 29235 | 24932 | 29953 | 33281 | 37536 | 46946 | 71887 |
| Elongation, % | 370 | 1468 | 1269 | 2254 | 1811 | 1958 | 1633 | 1549 | 1729 | 1930 |
| Tensile Strength, psi | 1229 | 1247 | 1110 | 1383 | 1500 | 1930 | 3557 | 4217 | 6219 | 7078 |
| Yield Stress, psi | 1790 | 1543 | 1631 | 1464 | 1640 | 1654 | 1825 | 1581 | 1589 | 1674 |
| Secant Modulus, dynes/cm$^2$ | 3.34×10$^9$ | 3.25×10$^9$ | 3.32×10$^9$ | 3.34×10$^9$ | 3.57×10$^9$ | 2.95×10$^9$ | 3.21×10$^9$ | 2.15×10$^9$ | 1.64×10$^9$ | 1.85×10$^9$ |
| Strain Rate | 100 | 100 | 100 | 100 | 100 | 100 | 100 | 100 | 100 | 100 |

These data illustrate the improvement in physical properties of the blends over polyoxyethylene alone.

The blends and the control sample containing no PCL were then tested in a series of swelling studies. In these tests, a plaque of each blend and the control sample measuring about 1 inch by ¼ inch was placed in a test tube with 3 cc. of distilled water and allowed to soak while being observed. The results are listed below.

0% PCL — deformed in 5 minutes, disintegrated in 65 minutes, and completely dissolved in 3 hours.

1% PCL — deformed in 5 minutes, disintegrated in 65 minutes, but did not completely dissolve.

2% PCL — deformed in 5 minutes, disintegrated in 65 minutes, but did not completely dissolve.

5% PCL — deformed in 5 minutes, disintegrated in 65 minutes, but did not completely dissolve.

10% PCL — deformed in 5 minutes, disintegrated in 24 hours, but did not completely dissolve.

20% PCL — slightly deformed in 17 minutes, did not disintegrate or dissolve.

50% PCL — no visible change during or after a 24-hour soaking period.

75% PCL — no visible change during or after a 24-hour soaking period.

90% PCL — no visible change during or after a 24-hour soaking period.

The percent weight losses for the 20% PCL, 50% PCL and 75% PCL blends after the above-described soaking and then drying for 29 hours in vacuum at room temperature were measured and were found to be, respectively, 74 weight %, 45 weight % and 12 weight %. This test illustrates the waterproofness imparted to polyoxyethylene by the presence of PCL. In addition, it illustrates that the polyoxyethylene polymer may be leached from the blend leaving a porous or microporous matrix, which is largely PCL.

The blends containing 1, 2, 5, 10 and 20% PCl and the control sample containing no PCL were tested in a stress endurance testing device. The test specimens were cut 7½ inches long and ¼ inch wide. Marks were made on each specimen 5 11/16 inches apart and each specimen was installed in the tester and locked in position at the marks made on them. The thickness of each specimen was 10 to 15 mils. The tester was then closed which stretched the film approximately 5%. This amount of stretch was maintained until the film broke. Four to six specimens were used iin each group. The results are given below:

0% PCL — All specimens broke after 3 to 5 minutes.

1% PCL — All specimens did not break for 14 to 21 minutes.

2% PCL — All specimens did not break for 20 to 30 minutes.

5% PCL — All specimens did not break for 1 to 2 hours. One specimen did not break but only necked when stretched for approximately 40 hours.

10% PCL — All specimens did not break for 35 minutes to 45 minutes. One specimen did not break for 72 hours. One specimen only slightly necked when stretched for about 192 hours.

20% PCL — All specimens did not break for 30 minutes to 5 hours. One specimen did not break but only slightly necked when stretched approximately 20 hours.

This test illustrates the toughness or stress endurance imparted by PCL to the polyoxyethylene.

EXAMPLE 6

A series of three blends (Nos. 29-31) were made from a cyclic ester polymer and a maleic anhydride-methyl vinyl ether copolymer of medium molecular weight having a softening point range of about 200° to 225°C., a specific viscosity of 1.0 to 1.4 dl/g at a concentration of 1 g copolymer dissolved in 100 ml methyl ethyl ketone at 25°C. and a specific gravity as a film of 1.37.

The cyclic ester polymer (PCL) used in each case was prepared in the same manner as described in Example 1 and the amount used was sufficient to provide the percentages listed in Table VI below.

In making the 10% PCL blend, the copolymer was added to the mill first and then the PCL but milling behavior was poor to fair in most respects although it was good respecting bank and hot strength. Therefore, in making the 50% PCL and 90% PCL blends, the PCL was first added to the mill and then the copolymer and milling behavior was very much improved in all respects. The resulting blends were milled on a two-roll mill for about 5 minutes at 120° to 165°C. The blends were then compression molded into plaques about 20 to 30 mils thick.

Attempts were made to compression mold the control sample of the copolymer containing no PCL. However, gas coming off of the sample during heating forced the molding plates apart and prevented molding even under a pressure of 20,000 psi at a temperature of 215°C. for 2 minutes. The control sample shrank and turned brown in the attempts to compression mold it.

The plaques formed from the blends were tested in an Instron tensile tester and the physical properties are given in Table VI below.

TABLE VI

|  | 29 | 30 | 31 |
|---|---|---|---|
| % PCL | 10 | 50 | 90 |
| Rupture Energy, in.lbs./in.$^3$ | 53 | 847 | 21790 |
| Elongation, % | 2 | 36 | 1152 |
| Tensile Strength, psi | 2942 | 2494 | 2690 |
| Yield Stress, psi | — | — | 1920 |
| Secant Modulus, dynes/cm.$^2$ | 12.53×10$^9$ | 5.03×10$^9$ | 2.44×10$^9$ |

Note:
Data obtained at 100% strain rate.

This example illustrates the modification of a difficultly moldable polymer in accordance with this invention to render it more easily moldable.

EXAMPLE 7

A series of three blends were made by fluxing on a two-roll mill a cyclic ester polymer and a high purity cellulose tridecanoate having all three hydroxyl hydrogens of each anhydroglucose unit substituted with decanoly groups and a glass transition temperature of about 60°C. determined from mechanical loss measurements made with a recording torsion pendulum that operated at about one cyclic per second. Cellulose tridecanoate of this type has a melting point range of about 85° to about 95°C., a density of about 1.015 to about 10.02 g/ml, and a specific rotation in chloroform with 589 millimicron light at 25°C. of about −2°C.

The cyclic ester polymer was used in sufficient amounts to provide the proportions respectively set forth in Table VII below. The cyclic ester polymer PCL) used in each case was prepared from epsilon-caprolactone in the same manner as described in Example 1. The resulting blends were milled at a temperature of about 50° to about 90°C. for approximately 5 minutes, and then sheeted off of the mill and cooled. Milling behavior for all blends was quite good.

A similar quantity of the cellulose tridecanoate identified above was fluxed in the same manner at a temperature of about 90°C. for about 5 minutes. No PCL was added to this control sample.

The resulting blends and control sample were then compression molded into plaques about 20 to 30 mils thick. The plaques were then tested in an Instron tensile tester and the physical properties are given in Table VII below.

TABLE VII

|  | 32 | 33 | 34 | 35 |
|---|---|---|---|---|
| PCL | 0 | 10 | 50 | 90 |
| Rupture, Energy, in./lbs./in.$^3$ | 584 | 350 | 1645 | 42389 |
| Elongation, % | 90 | 68 | 178 | 1668 |
| Tensile Strength, psi | 590 | 487 | 836 | 6040 |
| Yield Stress, psi | 771 | 613 | 1006 | 1459 |
| Secant Modulus, dynes/cm.$^2$ | $9.61 \times 10^8$ | $7.74 \times 10^8$ | $1.19 \times 10^9$ | $1.82 \times 10^9$ |

Note:
Data obtained at 100% strain rate.

All samples were compression molded at 80° to 110°C. for 10 seconds at 500 psi. The milling behavior as well as most physical properties of the blends improved as the amount of PCL in the blends was increased.

EXAMPLE 8

Two blends were made by mixing the granulated forms of cyclic ester polymer (PCL) of epsilon-caprolactone (same as used in Example 1) and nylon in amounts adquate to provide the percentages of PCL listed in Table VIII below. The nylon used was Firestone Nylon 6 Type 200-001. Melt indices at various temperatures were found to be as follows:

| Temp. | Melt index |
|---|---|
| 260°C. | 23.5 |
| 270°C. | 35.2 |
| 280°C. | 50.5 |
| 290°C. | 64.0 |
| 300°C. | 82.8 |
| 310°C. | 86.5 |

The powder blend was heated to melt the powder while under a nitrogen atmosphere and stirred until the blend was thoroughly mixed and uniform. The blend was then cooled to room temperature under a nitrogen atmosphere. Plaques about 20 to 30 mils thick were compression molded from each blend and these plaques were tested in an Instron tensile tester. The physical properties are given below:

TABLE VIII

|  | 36 | 37 |
|---|---|---|
| % PCL | 10 | 5 |
| Rupture Energy, in.lbs./in.$^3$ | 10265 | 551 |
| Elongation, % | 166 | 20 |
| Tensile Strength, psi | 7211 | 3127 |
| Secand Modulus, dynes/cm$^2$ | $7.27 \times 10^9$ | $12.91 \times 10^9$ |

Note:
Data obtained at 100% strain rate.

EXAMPLE 9

Three blends were prepared each containing 400 parts of nylon 6 pellets containing titanium dioxide and, respectively, 10.29 parts, 21.05 parts, and 44.45 parts of a cyclic ester polymer (PCL) of epsilon-caprolactone prepared in the same manner as described in Example 1, except 0.3% catalyst was used and the resulting cyclic ester polymer had a reduced viscosity of 1.98. Nylon 6 of this type was purchased from Courtaulds as Dull 704, contains TiO$_2$ and has a relative viscosity without the TiO$_2$ of 2.26 in sulfuric acid at 1% nylon concentration. The blends were prepared by dissolving the cyclic ester polymer in 400 parts of methylene chloride. Each of the resulting solutions was then contacted with the nylon pellets and the resulting mixture was then stirred and dried to effect a substantial coating of the nylon with the cyclic ester polymer.

A control sample of the same nylon 6 was treated with an equivalent amount of methylene chloride which contained no PCL.

These blends and control sample were then mixed with an equal weight of the same nylon 6 but which had not been treated with MeCl$_2$ or PCL. Thus the final blends contained 1.25, 2.5 and 5% PCL. Each of the blends and control sample were then spun into multifilament yarns using a spinning head temperature of 265°C. and a polymer temperature of 245°C. The spinneret had 25 holes of 0.020 in. diameter. The measured yarn take-up velocity was 300 feet per minute and the orifice velocity was 5 feet per minute giving a melt-draw ratio of 60 to 1. Spinning behavior was good with the 0, 1.25 and 2.5% PCL blends. The cold-drawing or stretch data are given in Table IX. The stretching aid in the colddrawing process was a 120°C. pin. The physical properties of these spun yarns are listed in Table IX.

TABLE IX

| % PCL | 0 | 1.25 | 2.5 | 5 |
|---|---|---|---|---|
| Cold Draw Data |  |  |  |  |
| Feed rate | 100 ft/min. | 100 ft/min. | 100 ft/min. | 100 ft/min. |
| Take-up rate | 480 ft/min. | 500 ft/min. | 480 ft/min. | 420 ft/min. |
| % Stretch | 380 | 400 | 380 | 320 |
| Average Denier | 178 | 171 | 179 | 207 |
| Tenacity gm./denier | 7.2 | 6.9 | 6.2 | 5.0 |
| % Elongation | 15.2 | 15.4 | 16.9 | 18.9 |
| Stiffness, gm./denier | 43.6 | 44.0 | 37.0 | 31.6 |

Regarding the physical properties in Table I, these were determined with an Instron tensile tester using a 10 in. gauge length and a 6 in. per min. rate of extension. The % extension is the extension at the first filament break after which the load does not increase. The figures given in Table X are averages of 5 tests.

The 95% Nylon-6/5% PCL fibers had an 8.9% shrinkage in boiling water, a 7.4% shrinkage in 150°C. air, and 14.4% shrinkage in 200°C. air. No shrinkage was measured on the other three samples.

The spun fibers were dyed with
1. Celliton Fast Navy Blue BA, a disperse dyestuff
2. Celliton Fast Red GGA, a disperse dyestuff
3. Celliton Fast Black BA, a disperse dyestuff
4. Capracyl Red B, a premetallized dyestuff.

All samples had excellent dyepickups, however, the PCL containning blends had slightly deeper colors.

EXAMPLE 10

A series of three blends were made by fluxing on a two-roll mill a cyclic ester polymer and a stilbene-acrylonitrile copolymer.

The acrylonitrile-stilbene copolymer was prepared by solution polymerization in dimethyl formamide. The copolymer composition by monomer charge was 33/67 acrylonitrile-stilbene on a weight basis. Nitrogen analysis showed that composition obtained was 49.7/51.3 acrylonitrile-stilbene on a weight basis. The cataalysts used were 0.5% dibenzoylperoxide and 0.5% azobis-[isobutyronitrile]. Reduced viscosity of the copolymer in dimethylformamide at 30°C. was 0.36 dl/gm when measured at a concentration of 0.2 gm/100 ml. The cyclic ester polymer (PCL) was made from epsilon-caprolactone in the manner described in Example 1 and was used in amounts adequate to provide the proportions of PCL respectively set forth in Table X below. The resulting blends were milled for 5 minutes at about 175°C. During milling, it was noted that fluxing, dispersion and banding were quite good. After the designated milling time, the blends were sheeted off of the mill and cooled. Plaques were compression molded from each of the milled blends and the tensile properties were determined with an Instron tensile tester. The tensile properties are given in the table below.

TABLE X

|  | 43 | 44 | 45 |
|---|---|---|---|
| % PCL | 25 | 50 | 90 |
| Rupture Energy, in.lbs./in.$^3$ | 5 | 53 | 5082 |
| Elongation, % | 1 | 4 | 325 |
| Tensile Strength, psi | 1116 | 2170 | 1635 |
| Yield Stress, psi | — | — | 1916 |
| Secant Modulus dynes/cm.$^2$ | 9.11×10$^9$ | 5.91×10$^9$ | 2.89×10$^9$ |

Note:
Data obtained at 100% strain rate.

EXAMPLE 11

A series of four blends were made by fluxing on a two-roll mill a cyclic ester polymer and an acetylated ethyl cellulose having an M. S. of 1.1 (average of 1.1 mols of ethylene oxide chemically added to each anhydroglucose unit), a D. S. of 1.6 (an average of 1.6 acetyl groups substituted for hydroxyl hydrogen per anhydroglucose unit) and having a reduced viscosity of 3.62 dl/g at a concentration of 0.2 g acetylated ethyl cellulose dissolved in 100 ml dimethylsulfoxide at 30°C.

The cyclic ester polymer was used in amounts adequate to provide the proportions listed in Table XI below. The cyclic ester polymer (PCL) used was made from epsilon-caprolactone in the same manner as described in Example 1. The resulting blends were milled for about 5 minutes at about 180°C. and then each blend was sheeted off of the mill and cooled. It was noted during milling that those blends containing more PCL provided better mill behavior. At 10% PCL and more, fluxing, banding, bank and dispersion characteristics were good.

The blends as well as a control sample containing no PCL were compression molded under a pressure of 5000 psi for the control sample and the 1% blend and 1000 psi for the remaining blends. The compression molding temperature was 170° to 190°C. and molding time was 10 seconds. Each of the resulting plaques, about 20 to 30 mils thick, was then tested in an Instron tensile tester and the physical properties are listed in Table XI below.

TABLE XI

|  | 46 | 47 | 48 | 49 | 50 |
|---|---|---|---|---|---|
| % PCL | 0 | 1 | 10 | 50 | 90 |
| Rupture Energy, in.-lbs./in.$^3$ | 280 | 122 | 51 | 33 | 7409 |
| Elongation, % | 6 | 4 | 3 | 3 | 473 |
| Tensile Strength, psi | 5936 | 5262 | 2884 | 1667 | 1628 |
| Yield Stress, psi | — | — | — | — | 1642 |
| Secant Modulus, dynes/cm$^2$ | 12.25×10$^9$ | 13.47×10$^9$ | 9.75×10$^9$ | 4.9×10$^9$ | 2.58×10$^9$ |

Note:
Data obtained at 100% strain rate.

EXAMPLE 12

A blend was prepared by milling equal parts of carboxymethyl cellulose and a cyclic ester polymer of epsilon-caprolactone made in the same manner as described in Example 1. The carboxymethyl cellulose had a degree of polymerization of about 3000 and an average degree of carboxymethylation of about 0.8 to 1.0. The two materials were milled together at 70°C. and sheeted off of a mill and cooled. The resulting film had substantial flexibility quite unlike carboxymethyl cellulose alone and was tough and leathery. The blend could be molded at temperatures of about 100° to 150°C.

EXAMPLE 13

A series of four blends (Nos. 52–55) were made from cellulose triacetate and a cyclic ester polymer, PCL. The cyclic ester polymer used was prepared by the bulk polymerization of epsilon-caprolactone using 0.2 weight percent stannous octoate as catalyst. This substantial homopolymer had a reduced viscosity of 0.65 dl/gm.

Arnel cellulose triacetate fibers (Celanese, 200 denier, filament 52, 5H Luster, type bright) were used as the cellulose triacetate. This type of fiber has a melting range at about 572°F., a specific gravity of about 1.3 and is further described in "Textile World, 1962, Man-made Fiber Chart." The fibers were washed twice with isopropanol to scour them of lusterants and other materials and then dried in a vacuum oven to remove excess residual isopropanol.

Solutions of the blends of scoured fibers and the PCL, and a control solution of the scoured fibers (No. 51) containing no PCL, were prepared in methylene chloride in the weight ratios indicated in Table XII. The solutions were warmed slightly to effect solution. Thin films were then cast onto Teflon and dried for about 1 hour or more. Portions of the thin films were tested in an Instron tensile tester to determine tensile properties. Results are shown in Table XII.

The film clarity given in Table XII was judged by visual observation. There is a definite increase in haze as the PCL content is increased. All films are very smooth except for the 30% PCL film which is rough. The 30% PCL film absorbed fountain pen ink and, after dry, writings on it could not be easily rubbed off. They could be easily rubbed off of the other films. The haze increase in the blends with increasing PCL permits the manufacture of a more opaque fiber, i.e. one which has a greater hiding capacity. In addition, the tensile properties of the 10, 20 and 25% PCL-containing blends show that PCL is acting as a polymeric plasticizer for the cellulose triacetate permitting a tougher fiber when blends of the two materials are spun into a fiber.

EXAMPLE 14

A series of two blends (Nos. 57 and 58) were made from cellulose diacetate and a cyclic ester polymer (PCL). The cyclic ester polymer was prepared by bulk polymerization of epsilon-caprolactone using stannous octoate as catalyst. The substantial homopolymer had a reduced viscosity of 0.65 dl/gm.

The cellulose diacetate used was an Eastman product having an acetyl content of 40% and an ASTM viscosity of 25.

Solutions of the two blends and a control solution (No. 56) containing cellulose diacetate but no PCL were prepared in acetone in the weight ratios indicated in Table XIII. The solutions were warmed to about 55°C. to aid in effecting solution. Thin films were then cast on Teflon. The films were covered during drying. When dry, portions of the films were tested in an Instron tensile tester to determine tensile properties which are summarized in Table XIII.

Film clarity was judged by visual observation. All films were smooth. The data show that low amounts of PCL will plasticize cellulose diacetate. The haze development permits a more opaque fiber with greater hiding power to be spun from such blends.

TABLE XIII

|  | 56 | 57 | 58 |
|---|---|---|---|
| Parts PCL | 0 | 2 | 4 |
| Parts Cellulose Diacetate | 18 | 18 | 16 |
| Parts Acetone | 90 | 90 | 90 |
| % PCL | 0 | 10 | 20 |
| 1% Secant Modulus, psi | 216,000 | 146,000 | 116,000 |
| Tensile Strength, psi | 13,700 | 10,200 | 6,000 |
| Elongation, % | 6 | 18 | 4 |
| Rupture Energy, in.lbs./in.$^3$ | 600 | 1300 | 160 |
| Film Clarity | Clear | Very slight haze | Slight haze |

EXAMPLE 15

A series of five blends (Nos. 60–64) were made from a chlorinated polyether and a cyclic ester polymer (PCL).

Penton (Hercules Powder Co., Inc.) was the chlorinated polyether used. Its monomer, which is a chlorinated oxetane, is synthesized from pentaerythritol. The chlorinated polyether had a molecular weight average range of 250,000 to 350,000. It is a linear thermoplastic polymer that is crystalline in nature and has recurring units of the formula:

TABLE XII

|  | 51 | 52 | 53 | 54 | 55 |
|---|---|---|---|---|---|
| Parts PCL | 0 | 1 | 2 | 5 | 6 |
| Parts Cellulose Triacetate | 9 | 9 | 8 | 15 | 14 |
| Parts MeCl$_2$ | 90 | 90 | 90 | 90 | 90 |
| % PCL | 0 | 10 | 20 | 25 | 30 |
| 1% Secant Modulus, psi | 210,000 | 208,000 | 166,000 | 151,000 | 153,000 |
| Tensile Strength, psi | 9,700 | 9,100 | 7,200 | 9,200 | 5,000 |
| Elongation, % | 14 | 15 | 26 | 22 | 5 |
| Rupture Energy, in.-lbs./in.$^3$ | 1100 | 1060 | 1500 | 1780 | 150 |
| Film Clarity | Clear | Clear but slightly hazy | Clear but somewhat hazy | Clear but quite hazy | Clear but very hazy |

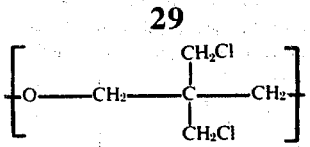

The cyclic ester polymer used was prepared by the dispersion polymerization of epsilon-caprolactone in heptane using a vinyl chloride/lauryl methacrylate copolymer as the interfacial agent. Catalyst was triisobutylaluminum. Reduced viscosity was 1.88 dl/gm.

The above polymers were blended in the ratios indicated in Table XIV in a Brabender head with the jacket temperature set at 220°C. for 5 to 10 minutes. After blending the polymer mixtures were removed from the Brabender and plaques were compression molded. Plaques as control samples (NO. 59) were also compression molded from the chlorinated polyether which contained no PCL. Strips cut from these plaques were used to determine the tensile properties which are summarized in Table XIV using an Instron tensile tester. The glass transition temperatures, Tg, shown in the table were taken from the maximum in the loss component of the complex shear modulus which was determined through data taken with a recording torsion pendulum. Frequency of measurement at Tg was about 1 to 2 cycles per second.

The results in Table XIV show that PCL is a polymeric plasticizer for chlorinated polyether. Increasing amounts of PCL produced a tougher product.

about 5 minutes. Milling behavior: fluxing, banding, bank and dispersion were good for the control sample and for all blends. Roll release and hot strength were poor for the control sample and for the blends. After hot blending, the blends and control sample were removed from the mill and compression molded into plaques.

Physical properties of the blends and the control sample were determined with an Instron tensile tester. These physical properties are given in Table XV. The properties were determined on strips about ¼ inch wide, 1 inch long (gauge length) and about 0.030 inch thick. The glass transition temperatures, Tg, were determined as described in Example 15.

TABLE XV

|  | 65 | 66 | 67 | 68 |
| --- | --- | --- | --- | --- |
| % PCL | 0 | 10 | 50 | 90 |
| 1% Secant Modulus, psi | 400 | 250 | 9300 | 26,000 |
| Tensile Strength, psi | 220 | 150 | 4500 | 7700 |
| Elongation, % | 1400 | 1400 | 1600 | 1750 |
| Rupture Energy, in.lbs./in.$^3$ | 1900 | 1500 | 33,000 | 57,000 |
| Tg, °C | −10 | −25 | −42 | −52 |

The above test results show that blends containing PCL have impoved creep resistance, improved moldability and formability, and improved low temperature properties. PCL is a polymeric plasticizer for the polyepichlorohydrin elastomers.

TABLE XIV

|  | 59 | 60 | 61 | 62 | 63 | 64 |
| --- | --- | --- | --- | --- | --- | --- |
| % PCL | 0 | 10 | 25 | 50 | 75 | 90 |
| 1% Secant Modulus, psi | 88,000 | 70,000 | 25,000 | 33,000 | 30,000 | 25,000 |
| Tensile Strength, psi | 3,100 | 3,700 | 3,700 | 3,700 | 5,200 | 5,300 |
| Elongation, % | 105 | 120 | 940 | 1,000 | 1,800 | 1,500 |
| Rupture Energy, in.-lbs./in.$^3$ | 4,100 | 4,100 | 23,500 | 27,000 | 45,000 | 40,000 |
| Tg, °C | +18 | — | −10 | −35 | −50 | — |
| Milling Temperature, °C | Not milled (Plaque merely molded.) | 220 | 220 | 220 | 220 | 220 |
| Milling Time, min. |  | 5–10 | 5 | 5–10 | 5 | 5–10 |

EXAMPLE 16

A series of three blends (Nos. 66–68) were made from a thermoplastic poly(epichlorhydrin) and a cyclic ester polymer (PCL) prepared from epsilon-caprolactone in the manner described in Example 1. The poly(epichlorhydrin) used was a commercial product sold by B. F. Goodrich Co. under the name HYDRIN 100. It contained recurring units of the formula:

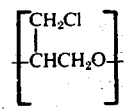

and had a specific gravity of about 1.36. The polymer had a reduced viscosity of about 2 dl/gm when measured in dimethylformamide at 30°C. and a concentration of 0.2 gm/100 ml.

Blends of these two polymers and a poly(epichlorhydrin) control sample with no PCL (No. 65) were milled on a two-roll mill at 120°C. using a milling time of The blends containing 50%, and especially 90%, or more of PCL are useful as low melt adhesives having improved cohesive strength. Moreover, the blends containing 40% or more PCL are useful in the production of films which can be oriented by stretching at elevated temperatures below the melting point of the blends and cooling while maintaining the stretched condition. Such oriented films are useful as heat shrinkable films for packages, seals, repair tapes or films and connectors.

EXAMPLE 17

A series of three blends (Nos. 70–72) were made from a thermoplastic epichlorhydrin-ethylene oxide copolymer and a cyclic ester polymer (PCL) prepared from epsilon-caprolactone in the same manner as described in Example 1. The epichlorhydrin-ethylene oxide copolymer used was a commercial product, HYDRIN 200, sold by B. F. Goodrich Co. it contained recurring units of the formulas:

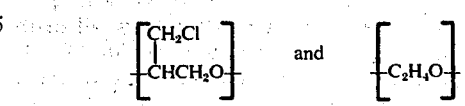

nd had a specific viscosity of 1.27. The polymer had reduced viscosity of about 3.3 dl/gm when measured i dimethylformamide at 30°C. and a concentration of .2 gm per 100 ml.

Blends of these two polymers and a copolymer conol sample (No. 69) containing no PCL were milled on two-roll mill at 120°C. using a milling time of 5 mintes. Milling behavior in fluxing, banding and disperon were good. Bank, roll release and hot strength ere considerably improved in the blends as compared ) the control sample and thus the hot processability of ıe blends was considerably better than that of the conol sample. After hot blending the control samples and ıe blends were compression molded into plaques. Physical properties of the blends were determined ith an Instron tensile tester. These physical properties re given in Table XVI. The properties were deterıined on strips about ¼ inch wide, 1 inch long, and .030 inch thick. The glass transition temperatures, Tg, ere determined as described in Example 15.

TABLE XVI

|  | 69 | 70 | 71 | 72 |
|---|---|---|---|---|
| PCL | 0 | 10 | 50 | 90 |
| % Secant Modulus, psi | 50 | 530 | 7700 | 29,000 |
| ɔnsile Strength, psi | 20 | 80 | 2600 | 6500 |
| longation, % | 230 | 670 | 1500 | 1900 |
| ιupture Energy, in.lbs./in.$^3$ | 50 | 460 | 22,400 | 58,000 |
| g, °C. | −35 | −40 | −45 | −49 |

These results show that addition of PCL improves the reep resistance of the copolymer, improves moldability and formability of the copolymer, and improves the ıw temperature properties of the copolymer.

The blends containing 50%, and especially 90%, or ıore of PCL are useful as low melt adhesives having nproved cohesive strength. Moreover, the blends conıining 40% or more PCL are useful in the production f films which can be oriented by stretching at elevated ɛmperatures below the melting point of the blends and ɔoling while maintaining the stretched condition. ucĥ oriented films are useful as heat shrinkable films ɔr packages, seals, repair tapes or films and connecɔrs. For example, a film of the 50% PCL blend and a ılm of the 90% PCL blend were each hot stretch oriıted in the above fashion and wrapped around an ongated object. The films in each case were warmed ) about 50°C. and allowed to cool. The tapes adhered ghtly to the object.

EXAMPLE 18

A particulate cyclic ester polymer (PCL) made by ispersion polymerization of epsilon-caprolactone in ıe presence of vinyl chloride-lauryl methacrylate coɔlymer as interfacial agent and triisobutylaluminum as ıtalyst and having a reduced viscosity of 0.6 was .ixed in different proportions as shown in Table XVII ith cellulose acetate butyrate (10th Second butyrate, astman Chemical Products) containing 13 percent ac.al and 37 percent butyral and having a viscosity of ɔout 0.1 seconds as determined by ASTM method D343-54T. These mixtures were prepared by dissolving ıch of the polymers in 2-nitropropane to give soluɔns containing about 20 percent polymer. Admixtures ˤ these solutions were then prepared in the proporɔns shown in TAble XVII hereinafter. Films of these mixed solutions were cast on glass plates giving dried films about 5 to 6 mils thick. The tensile properties of the dried films were determined and the resulting data are given in TAble XVII.

TABLE XVII

Physical Properties of Poly-Epsilon-Caprolactone/Cellulose Acetate Butyrate

| Ratio of PCL/Cellulose Acetate Butyrate, by weight | Ultimate Tensile Strength$^{(a)}$ pounds/inch$^2$ | Percent Elongation |
|---|---|---|
| 1:0 | 2300 | 1400 |
| 9:1 | 1550 | 710 |
| 3:1 | 1900 | 220 |
| 3:2 | 2100 | 100 |
| 1:1 | 2530 | 22 |
| 2:3 | 670 | 45 |
| 1:3 | 3130 | 23 |

$^{(a)}$ASTM 683-67T

The films containing less than about 50 percent of PCL were clear, indicating compatibility of PCL and cellulose acetate butyrate in this range of compositions. Films with about 50 percent PCL or higher were hazy. Films containing less than about 10 percent PCL were too brittle to be removed intact from the glass plates for testing.

The demonstrated compatibility of PCL with cellulose acetate butyrate indicates the wide scope of applications of cyclic ester polymers as modifiers for cellulosic polymers. Cellulosic polymers are, of course, used in a wide variety of applications, such as, molded articles, protective coatings, paints, and inks, to mention only a few.

EXAMPLE 19

The cyclic ester polymer (PCL) used was a homopolymer prepared by the dispersion process using heptane as the nonsolvent and 5% of a vinyl chloride/laurylmethacrylate copolymer as the interfacial agent. Catalyst was 0.6% dibutyl zinc. Reduced viscosity of the PCL was 3.17.

The polyurethane used was made from 1 mole polyol, 2 moles MDI and 1 mole 1,4-butanediol. The polyol is a 2000 number average molecular weight polycaprolactone diol that is prepared from epsilon-caprolactone using diethylene glycol as the initiator and is hydroxy terminated on both ends. MDI is 4,4'-diphenylmethane diisocyanate. The polyurethane was prepared in the following manner. The polyol and 1,4-butane diol are mixed and heated to 140°C. Then the MDI is added and after mixing well (1or 2 min. after the MDI addition) the system is placed in a forced-air oven set at 180°C. for 1 hour to cure. After this the system is cooled to room temperature and granulated. The result is a thermoplastic polyurethane having a reduced viscosity of about 0.8 when measured in dimethylformamide at 30°C. and a concentration of 0.2 gm per 100 ml. 16 parts of PCL and 4 parts of the polyurethane were blended on a two-roll mill for 5 minutes at 140°C. Milling behavior was good although there was some sticking to the mill rolls. After blending the mixture was removed from the mill, cooled, and then compression molded into plaques at 150°C. and 1000 psi for 10 sec. The physical properties of the blend are compared with those of a control sample of the same polyurethane containing no PCL in Table XVIII. Approximate specimen size was ¼ in. × 1 in. × 0.030 in.

TABLE XVIII

| % PCL | 0 | 80 |
| --- | --- | --- |
| 1 % Secand Modulus, psi | 860 | 25,000 |
| Tensile Strength, psi | 5000 | 6,000 |
| % Elongation | 1850 | 1,700 |
| Yield Stress, psi | — | 1,400 |
| Rupture Energy, in.lbs./in.$^3$ | — | 44,000 |

Oriented films of the blend are quite clear and strong. Such blends or similar blends are useful as heat shrinkable packaging films.

EXAMPLE 20

The cyclic ester polymer (PCL) used was a blend of four substantial homopolymers prepared by the dispersion polymerization of epsilon-caprolactone in heptane using a vinyl chloride/lauryl methacrylate copolymer as the interfacial agent. Three of the substantial homopolymers were prepared using triisobutylaluminum as the catalyst, and one was prepared with dibutylzinc as the catalyst. The blend had a reduced viscosity of about 1.4 dl/gm.

The polyurethane used was a thermoplastic elastomer prepared from 1 mole polyol, 1.95 moles MDI, and 1 mole of 1,5-pentanediol. The polyol was a 2000 number average molecular weight polycaprolactone diol that was prepared from epsiloncaprolactone using 1,4-butanediol as the initiator and was hydroxy terminated on both ends. MDI is 4,4'-diphenylmethane diisocyanate. The polyurethane was prepared in the following manner. After mixing the polyol and 1,5-pentanediol at about 145°C., the MDI was added. After mixing well (1 or 2 minutes after the MDI addition) the system was placed in a forced air oven set at 180°C. for 1 hour to polymerize. After this, the system was cooled to room temperature and granulated. The result was a thermoplastic polyurethane that had an intrinsic viscosity (i.e. the extrapolation of reduced viscosity values to zero concentration) of 0.86 dl./gm. when measured in dimethylformamide at 30°C.

The PCL and polyurethane were blended on a two-roll mill at 140°C. for about 5 minutes. The milling behavior was good regarding fluxing, banding, and dispersion. There was some rolling in regard to the bank behavior. Roll release was poor, and hot strength of blend was fair. Details of blend compositions and physical properties of the blends are given in Table I as compared to those of the polyurethane containing no PCL.

These data indicate that a more extensible and a softer (as shown by tensile modulus) material is made when PCL is blended with the polyurethane without major changes in hardness, tensile strength, tear, compression set, or resilience.

Substantially similar results are obtained as in respectively Examples 1–19 when the substantial homopolymers of, and copolymers of two or more of, the following cyclic esters are respectively substituted for the epsilon-caprolactone polymer in each of these examples: delta-valerolactone, zetaenantholactone, eta-caprylolactone, monomethyl-delta-valerollactone, monohexyl-delta-valerolactone, tri-n-propyl-epsiloncaprolactone, monomethoxy-delta-valerolactone, diethoxy-deltavalerolactone, diethyl-epsilon-caprolactone and monoisopropoxyepsiloncaprolactone.

EXAMPLE 21

To a reaction vessel containing 1000 grams of a polyoxyethylene glycol having an average molecular weight of approximately 6000 heated to about 65°C. in a nitrogen atmosphere, there were added 8.87 grams of aqueous 50 percent sodium hydroxide solution. The resulting admixture was stirred until solution resulted. Thereafter a 109 gram portion of this solution was transferred to another vessel and heated to 95°C. in a nitrogen atmosphere, and 2,88 grams of diglycidyl ether of 2,2-bis(4-hydroxyphenyl)propane were quickly added, with stirring. This amount corresponds to a molar ratio of 0.5:1 of the diglycidyl ether to the polyoxyethylene glycol. Thereafter the temperature was held within the range of 95° to 110°C. for 40 minutes, and the reaction mixture was allowed to cool to room temperature and solidify. The solid material was a tan-colored wax which melted at 60°C. This dihydroxyl-terminated product was characterized by a polymeric chain having three polyoxyethylene segments therein which averaged about 6,000 molecular weight each, said chain being interspersed with the two phenylene-propylidenephenylene moieties from the diglycidyl diether reactant.

TABLE XIX

| | | | | | |
| --- | --- | --- | --- | --- | --- |
| Parts Polyurethane | 150.0 | 142.5 | 135.0 | 120.0 | 105.0 |
| Parts PCL | 0 | 7.5 | 15.0 | 30.0 | 45.0 |
| % PCL | 0 | 5 | 10 | 20 | 30 |
| Hardness, Shore A (ASTM D2240-64T) | — | 86 | 86 | 90 | — |
| Hardness, Shore D (ASTM D2240-64T) | 44 | — | — | — | 46 |
| 100% Tensile Modulus* | 1587 | 1507 | 1119 | 1311 | 1510 |
| 300% Tensile Modulus* | 2578 | 2404 | 1929 | 1843 | 1855 |
| Tensile Strength* | 3148 | 2940 | 2989 | 3253 | 3433 |
| Ultimate Elongation* | 477 | 455 | 530 | 608 | 645 |
| Tear Resistance, Die C (ASTM D624-54) | 728 | 678 | 598 | 670 | 676 |
| Compression Set, B (ASTM D395-61, Method B, 22 hrs. at 158°F.) | 62 | 63 | 60 | 64 | 60 |
| Rebound Resilience, % (Zwick & Co., Model Z51E rebound pendulum | 34 | 37 | 34 | 36 | 39 |

*ASTM D412-66

EXAMPLE 22

Three hundred grams of epsilon-caprolactone and three hundred grams of the hydroxyl-terminated polyether compound of Example 21 supra were added to a 1000 milliliter, 4-neck flask, equipped with a thermometer and stirrer. The system was sparged with nitrogen, heated to 120°C., and again sparged for about an hour with nitrogen. Thereafter 0.3 gram of stannous dioctanoate was added and the resulting reaction mixture heated to 180°C. and held at this temperature for 10 hours. During the entire period, the reaction mixture was maintained under nitrogen. When cooled to room temperature, there was obtained an opaque, white crystalline, polymeric product. Thereafter, this polymeric product was heated to 180°C. and held at this temperature for 1 hour under vacuum, e.g., about 1 mm. of Hg. The polymeric product was then cooled to room temperature dissolved in benzene, and precipitated and washed with hexane. There was obtained 575 grams of fine white powdery block polymer having an ABA configuration in which the A blocks are recurring oxypentamethylenecarbonyl units and the B block represents the product of Example 21 (without the terminal hydroxylic hydrogen atoms).

To test water solubility, 6.6 of this ABA block polymeric product was placed in 70.2 grams of distilled water and stirred overnight. After settling an aliquot of the supernatant liquid, i.e., 6.9 grams, was removed and dried to constant weight. The residue weighed .027 gram indicating that virtually no part of the block polymeric product was water soluble reconfirming that the desired reaction had taken place.

EXAMPLE 23

Three hundred grams of epsilon-caprolactone and three hundred grams of polyoxyethylene glycol having an average molecular weight of about 6,000 were added to a 1000 milliliter, 4-neck flask, equipped with thermometer and stirrer. The system was sparged with nitrogen, heated to 115°C., and again sparged for about an hour with nitrogen. Thereafter 0.25 gram of stannous dioctanoate was added and the resulting reaction mixture heated to 180°C. and held at this temperature for 10 hours. During the entire period, the reaction mixture was maintained under nitrogen. When cooled to room temperature, there was obtained an opaque, white crystalline, polymeric product. Thereafter, this polymeric product was heated to 180°C. and held at this temperature for 1 hour under vacuun, e.g., about 1 mm. of Hg. The polymeric product was cooled to room temperature, dissolved in benzene, and precipitated and washed with hexane. There was obtained a solid white block polymer having an ABA configuration in which the A blocks are recurring oxypentamethylenecarbonyl units and in which the B block represents recurring oxyethylene units.

EXAMPLE 24

Epsilon-caprolactone (1000 parts by weight) and polyoxyethylene glycol having an average molecular weight of about 3000 (300 parts by weight) were added to a reaction vessel. Stannous dioctanoate (1.0 part by weight) was added thereto. The vessel then was placed in an oil bath maintained at 180°C. for a period of 24 hours. Upon cooling to room temperature the resulting reaction product mixture was dissolved in benzene, followed by precipitation and washing with hexane, and then dried in a vacuum oven at room temperature for 3 days. There was obtained a water-insoluble, white, solid block ploymer having an ABA configuration in which the A blocks are recurring oxypentamethylenecarbonyl units and in which the B block represents recurring oxyethylene units.

EXAMPLE 25

In a manner similar to Example 24 supra, when methyl-epsilon-caprolactone is used in lieu of epsilon-caprolactone, there is obtained a water-insoluble, white, solid block polymer.

EXAMPLE 26

Epsilon-caprolactone (100 parts by weight) and the monomethyl ether of polyoxyethylene glycol having an average molecular weight of about 4000 (80 parts by weight) were added to a reaction vessel which was sparged with nitrogen, heated to 120°C., and again sparged for about an hour with nitrogen. Thereafter 0.2 part by weight of stannous dioctanoate was added and the resulting reaction mixture was heated to 180°C. under nitrogen and held at this temperature for 8 hours. When cooled to room temperature, there was obtained a water-insoluble, white solid block polymeric product having an AB configuration in which the A block represents recurring oxypentamethylenecarbonyl units and in which the B block represents recurring oxyethylene units.

EXAMPLES 27–32

Five blends of Nylon 6 and the cyclic ester polymer prepared in the manner set out in Example 22 were spun into multifilament yarns according to the procedure indicated previously. The volume resistivity and opacity of carpets made from such yarns were then determined and compared with a control which contained no cyclic ester polymer. The results are set out in Table XX below.

TABLE XX

| EXAMPLE NO. | CYCLIC ESTER POLYMER; 5 wt % [1] | VOLUME RESISTIVITY (ohm-cm) | OPACITY [7] |
|---|---|---|---|
| 27 | CONTROL | $2.2 \times 10^{-10}$ | 6 |
| 28 | [2] | $1.2 \times 10^{-10}$ | — |
| 29 | [3] | $1.5 \times 10^{-8}$ | — |
| 30 | [4] | $3.8 \times 10^{-8}$ | 3 |
| 31 | [5] | $5.6 \times 10^{-7}$ | 2 |
| 32 | [6] | $8.3 \times 10^{-6}$ | 1 |

[1] Cyclic ester polymer is an ABA block polymer prepared according to the procedure set out in Example 22.
[2] ABA block polymer in which the A blocks represent 80 wt. % recurring oxypentamethycarbonyl units and in which the B block represents about 20 wt. % recurring oxyethylene units prepared as noted in Example 21.
[3] Same as footnote (2) except that the A blocks represent 50 wt. % and the B block represents 50 wt. %.
[4] Same as footnote (2) except that the A blocks represent 55 wt. % and the B block represents 45 wt. %.
[5] ABA block polymer; B block derived from polyethylene glycol 6000. A blocks represent 33 wt. % oxypentamethylencarbonyl units and B block represents 67 wt. % oxyethylene units.
[6] Same as footnote (6) except that A blocks represent 30 wt. % and the B block represents 70 wt. %.
[7] An opacity value of 1 is the most opaque; blend has no $TiO_2$.

EXAMPLES 33–34

A blend of Nylon 6 and the cyclic ester polymer prepared in the manner set out in Example 23 were spun into multifilament yarns. Samples of carpet were woven from such yarns. The results of soil tests were determined and compared with a control (no cyclic ester in the blend). The results are set out in Table XXI below.

tic organic polymer, said percentages being based on the total weight of thermoplastic polymer and cyclic ester polymer.

TABLE XXI

| EXAMPLE NO. | CYCLIC ESTER POLYMER; 5 wt % | 20 MINUTE CYCLE WITH 0.02 GRAM SOIL | AFTER VACUUM CLEANING | AFTER VACUUM CLEANING AND SHAMPOOING |
|---|---|---|---|---|
| 33 | Control | Heavy Soiling | Slight Improvement | Very Slight Soiling Remaining |
| 34 | (1) | Light Soiling | do. | Restored to Original Condition |

(1) ABA block polymer prepared according to the procedure set out in Example 23 using polyethylene glycol 6000. A blocks represent 30 wt % oxypentamethylene units and B block represents 70 wt % oxyethylene units.

What is claimed is:

1. A thermoplastic composition consisting essentially of a blend of about 1 to about 95 weight percent of a cyclic ester polymer having a reduced viscosity of about 0.1 to about 15 and containing at least a major molar amount of recurring units I of the formula:

(I) 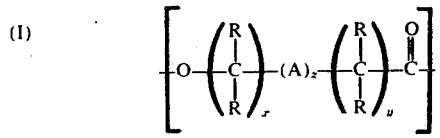

wherein each R, individually, is selected from the class consisting of hydrogen, alkyl, halo, and alkoxy, A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R substituents which are substituents other than hydrogen does not exceed 3, and up to a minor molar amount of recurring units II of the formula:

(II) 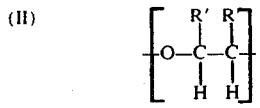

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having from 4 to 8 carbon atoms, and about 5 to about 99 weight percent of a polyester of a polyhydric alcohol having 2 to 18 carbon atoms and polycarboxylic acid or acid anhydride thereof having 2 to 18 carbon atoms as the thermoplastic organic polymer, said percentages being based on the total weight of thermoplastic polymer and cyclic ester polymer.

2. Composition as claimed in claim 1 wherein said cyclic ester polymer consists essentially of units I.

3. Composition as claimed in claim 1 wherein said cyclic ester polymer consists essentially of units I and II.

4. Composition as claimed in claim 1 wherein said cyclic ester polymer is present in a minor weight amount and said thermoplastic organic polymer is present in a major weight amount.

5. Composition as claimed in claim 1 wherein said cyclic ester polymer is present in the amount of about 2 to about 40 percent and said thermoplastic organic polymer is present in the amount of about 60 to about 98 percent based on the total weight of cyclic ester polymer and thermoplastic organic polymer.

6. Composition as claimed in claim 1 wherein said cyclic ester polymer is present in the amount of about 5 to about 30 percent and said thermoplastic organic polymer is present in the amount of about 70 to about 95 percent based on the total weight of cyclic ester polymer and thermoplastic organic polymer.

7. Composition as claimed in claim 1 wherein said cyclic ester polymer is characterized by the recurring structural recurring unit:

wherein each R is hydrogen or methyl, with the proviso that no more than three R substituents are methyl groups.

8. Composition as claimed in claim 1 wherein said thermoplastic polymer is poly(ethylene terephthalate).

* * * * *

UNITED STATES PATENT OFFICE
CERTIFICATE OF CORRECTION

Patent No. 3,892,821  Dated July 1, 1975

Inventor(s)  Joseph Victor Koleske et al.

It is certified that error appears in the above-identified patent and that said Letters Patent are hereby corrected as shown below:

Abstract, line 13 in the first paragraph thereof, "polysufone" should read --polysulfone--.

Column 3, line 36, insert "value" after the word "viscosity".

Column 5, line 16, after the word "Unit" insert "I".

Column 11, lines 2-3, the formula "$\{[NHR"NHCONHR"NHCO]\}$" should read --$\{NHR"NHCONHR"NHCO\}$--.

Column 11, line 6, the formula "$\{[NH(CH_2)_6NHCONH(CH_2)_6NHCO]\}$" should read --$\{NH(CH_2)_6NHCONH(CH_2)_6NHCO\}$--.

Column 12, line 36, "deleteriour" should read --deleterious--.

Column 13, line 56, "molulus" should read --modulus--.

Column 13, line 67, "modulas" should read --modulus--.

Column 14, line 27, "tensil" should read --tensile--.

Column 15, line 23, the word "vacuuming" insert a period ".".

Column 17, lines 20 to 25, formula

"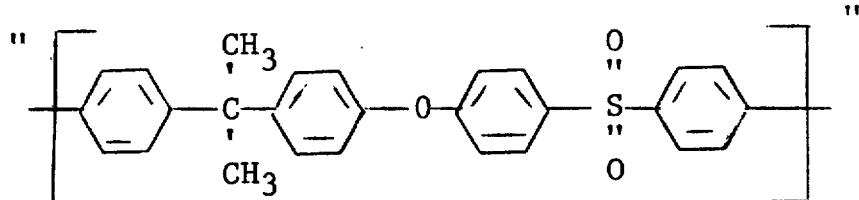"

should read

UNITED STATES PATENT OFFICE
CERTIFICATE OF CORRECTION

Patent No. 3,892,821    Dated July 1, 1975

Inventor(s) Joseph Victor Koleske et al.

It is certified that error appears in the above-identified patent and that said Letters Patent are hereby corrected as shown below:

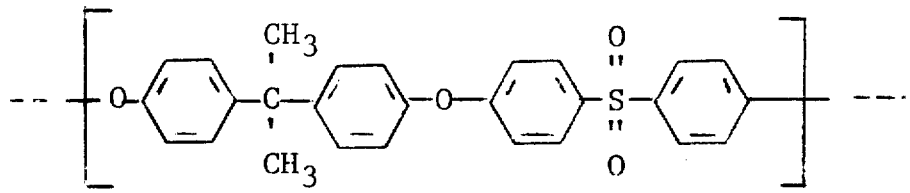

Column 18, lines 20 to 25, formula

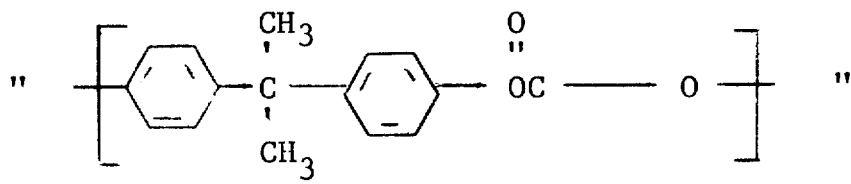

should read

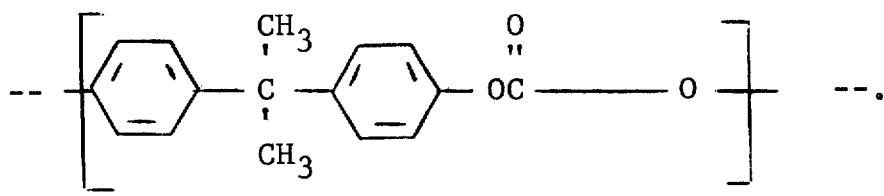

Column 22, line 58, "decanoly" should read --decanoyl--.

Column 22, line 64, "10.02 g/ml" should read --1.02 g/ml--.

UNITED STATES PATENT OFFICE
CERTIFICATE OF CORRECTION

Patent No. 3,892,821     Dated July 1, 1975

Inventor(s) Joseph Victor Koleske et al.

It is certified that error appears in the above-identified patent and that said Letters Patent are hereby corrected as shown below:

Column 24, line 14, "Secand" should read --Secant--.

Column 24, line 40, "these" should read --These--.

Column 25, line 20, "containning" should read --containing--.

Column 25, line 33, "cataalysts" should read --catalysts--.

Column 33, line 5, "Secand" should read --Secant--.

Column 36, footnote (2) of Table XX, line 54, "oxypentamethycarbonyl" should read --oxypentamethylenecarbonyl--.

Column 36, footnote (5) of Table XX, line 59, "oxypentamethylencarbonyl: should read --oxypentamethylenecarbonyl--.

Column 37, Formula (II) of Claim 1,

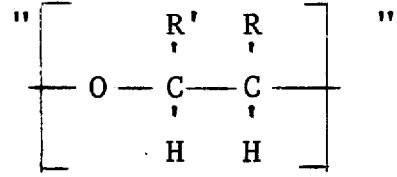

should read

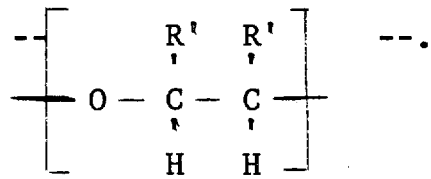

Signed and Sealed this thirteenth Day of April 1976

[SEAL]

Attest:

RUTH C. MASON
Attesting Officer

C. MARSHALL DANN
Commissioner of Patents and Trademarks